United States Patent [19]

Danish et al.

[11] 4,444,997

[45] Apr. 24, 1984

[54] DEVICE FOR GENERATING ELECTRIC SIGNALS REPRESENTING THE POSITION COORDINATES OF A STYLUS ON A REFERENCE SURFACE

[75] Inventors: Sherif Danish; Adel Danish, both of Paris, France

[73] Assignee: Polytel Computer Products Corp., Tulsa, Okla.

[21] Appl. No.: 425,452

[22] Filed: Sep. 28, 1982

[30] Foreign Application Priority Data

Aug. 18, 1982 [FR] France ................. 82 14288

[51] Int. Cl.³ ............................................ G08C 21/00
[52] U.S. Cl. ........................................ 178/18; 33/25 R
[58] Field of Search ............................... 178/18, 19, 20;
33/23 R, 22, 23 J, 25 R, 25 B, 25 C, 25 E;
358/295; 340/709; 346/139 C

[56] References Cited

U.S. PATENT DOCUMENTS

| | | | |
|---|---|---|---|
| 3,453,388 | 7/1969 | Neville | 178/18 |
| 3,858,324 | 1/1975 | Padowicz | 33/25 R |
| 3,864,515 | 2/1975 | Fee | 178/18 |

FOREIGN PATENT DOCUMENTS 2909847 9/1980 Fed. Rep. of Germany .
56-105588 11/1981 Japan .

OTHER PUBLICATIONS

IBM Technical Disclosure Bulletin vol. 10, No. 5, Oct. 1967, pp. 556 and 558.
IBM Technical Disclosure Bulletin vol. 18, No. 8, Jan. 1976, p. 2651.
IBM Technical Disclosure Bulletin vol. 19, No. 4, Sep. 1976, pp. 1435 and 1436.
IBM Technical Disclosure Bulletin vol. 21, No. 9, Feb. 1979, pp. 3481–3483.
IBM Technical Disclosure Bulletin vol. 21, No. 12, May 1979, pp. 5021, 5022.

*Primary Examiner*—Stafford D. Schreyer
*Attorney, Agent, or Firm*—Owen, Wickersham & Erickson

[57] ABSTRACT

A device for generating electric signals representing the position coordinates of a stylus on a reference surface, characterized in that it comprises a signal generator (6) that is fixed with respect to the reference surface and comprising a movable part (5) which works in conjunction with at least two potentiometers generating the voltages representing the said coordinates, the stylus (7) being a stylus for pointing on the reference surface, and mechanical linkage means being provided between this stylus and the said movable part so as to obtain a scaling down effect on the movements given to the stylus when they reach the potentiometers.

11 Claims, 6 Drawing Figures

DEVICE FOR GENERATING ELECTRIC SIGNALS REPRESENTING THE POSITION COORDINATES OF A STYLUS ON A REFERENCE SURFACE

Today all sizes of computer make it possible to display high resolution drawings on cathode ray screens in monochrome or colour. These drawings are either graphs worked out by the software or all kinds of drawings entered straight into the computer by means of special appliances.

Amongst drawing input equipment known to date there are the following:

the graphics tablet in which the drawing is made with a special stylus, working electronically in conjunction with and connected to a special board so that the position of the stylus on the board is systematically transferred to the computer which thus memorizes the drawing.

the light pen, working on the same principle as the graphics tablet, but in which the pen is connected to the terminal and can be moved over the computer terminal screen following the drawing to be memorized.

the optical reader consisting of an appliance, for example of the video camera type, which reads drawings already made and sends the coded data from this read-out to the computer.

All these machines are relatively expensive. The object of this invention is an appliance enabling such functions to be fulfilled and also capable of other applications of interest mentioned later, with the main advantage of being very much cheaper. Basically, for this purpose and according to the invention, the device for generating electric signals representing the position coordinates of a stylus on a reference surface is characterized in that it comprises a signal generator that is fixed with respect to the reference surface and comprising a movable part which works in conjunction with at least two potentiometers generating voltages representing the said coordinates, the stylus being a stylus for pointing on the reference surface, there being mechanical linkage means provided between this stylus and the said movable part so that the movements given to the stylus are scaled down when they reach the potentiometers.

It will be understood that such a set-up is particularly simple and also enables commercial potentiometers to be used advantageously.

Furthermore, several embodiments of generating devices according to the invention are described below as non-restrictive examples, reference being made to the appended drawings, in which.

Figure 1:
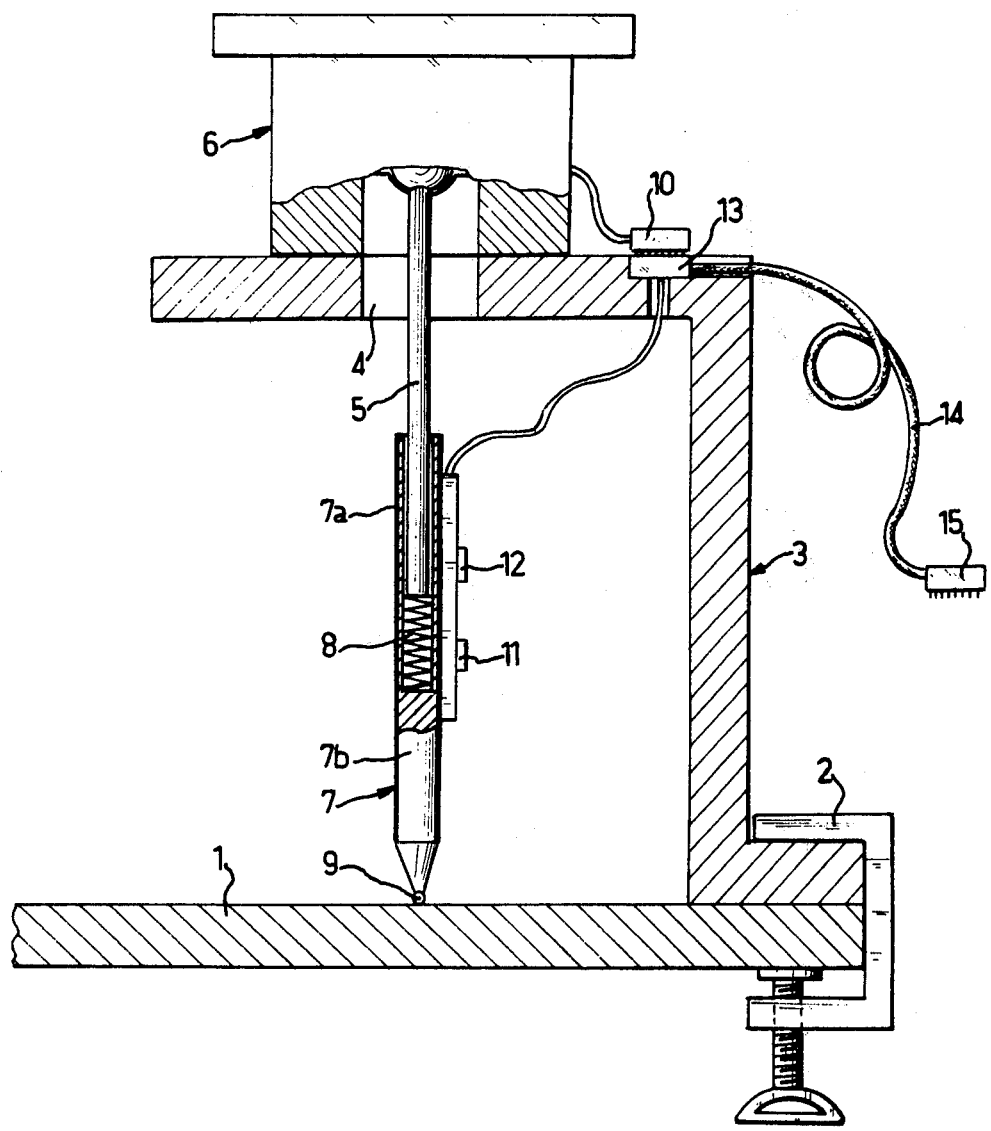
FIG. 1 is an elevation view of a first embodiment of a generating device according to the invention.

The device shown in FIG. 1 comprises a board 1 as reference surface onto which is fixed, by means of a clamp 2, a bracket 3, whose horizontal arm extends over the board. This arm has a hole 4 in it designed for a lever 5 to pass through in a downwards direction and forming the moving part of an electric signal generator 6 with two potentiometers, the voltages of which represent the positions of the lever, which is mounted so as to swivel in all directions with a given angular range. Such a signal generator exists on the commercial market and is well known under the name and trade mark of "JOYSTICK" in its normal application of controlling the running of video games, where it works in conjunction with a microprocessor with analogue input of two control voltages coming from the 'joystick' and used to move in rectangular coordinates (256×256 point grid, for example) a point or object displayed on a cathode ray screen, notably a television screen. In place of the normal 'joystick' lever a longer lever like 5 is here screwed in and has its free end coupled telescopically to a pointing stylus 7. This stylus comprises a tubular stem 7a fitted to slide on the lever, with a spring 8 being inserted between it and the stylus body 7b, here terminating in a tip with a spherical head 9 designed to point to or to follow or to define a path on the board intended to be recorded in a computer.

For this purpose the 'joystick' is normally provided with a pin-type connector 10, supplying, as has been stated, voltage signals representing the position of the lever and which are here used as X and Y coordinate indicators of the spherical head 9, in such a way that this connector has only to be connected to the interface for inputting and processing these two voltages in the computer so that they are, after analogue-to-digital conversion, stored in a suitable way in accordance with a program which is a question of software and does not need to be described here.

It is also possible to provide, as shown here, two pushbutton electric switches 11, 12 on the stylus designed to duplicate the two switches usually provided on the 'joystick', placing them within easier reach of the stylus user. These switches 11, 12 are then connected to a female pin-type connecter 13 which is complementary to the pin-type connector 10, fixed on the bracket and from which leads a flexible conductor 14 with a pin-type connector 15 connecting with the computer, similar to the 'joystick' connector 10. It can be seen that the aim of thus connecting connectors 13, 10 is to put switches 11, 12 of the stylus in parallel with those, not shown, of the 'joystick' box.

This embodiment already enables a relatively large path or drawing area to be covered by the spherical head 9 of the stylus whilst still remaining within the normal 'joystick' movement range.

Figure 2:
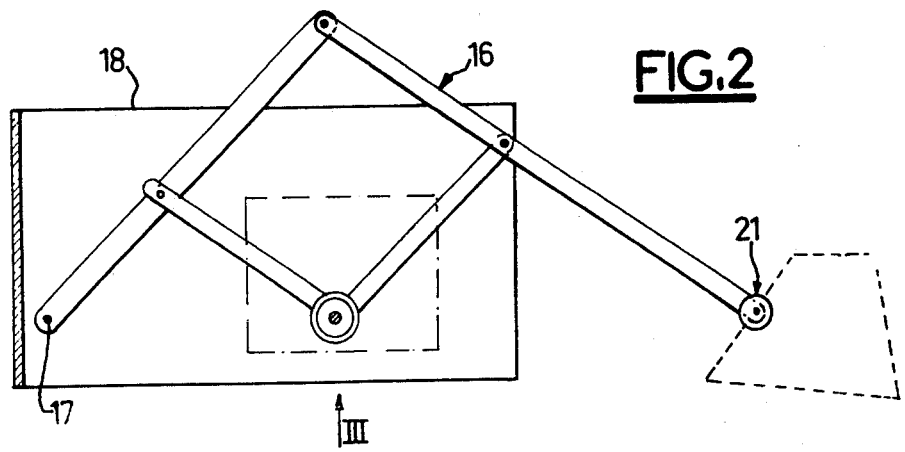
FIG. 2 is a plan view of a second embodiment with a section along II—II of FIG. 3.
Figure 3:
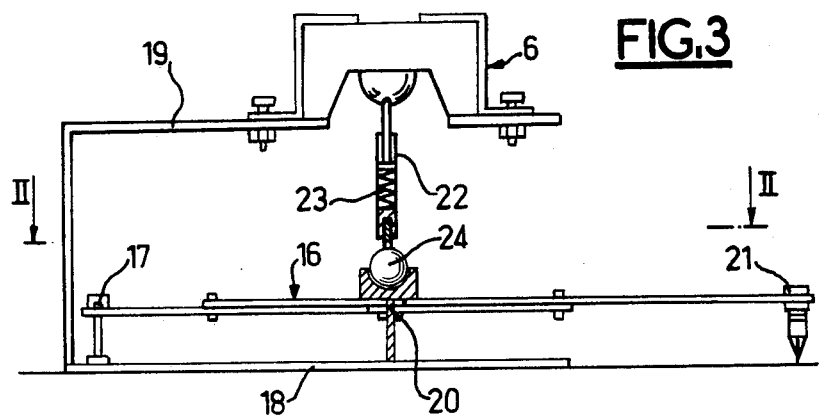
FIG. 3 is an elevation view of FIG. 2 along arrow III.

FIGS. 2 and 3 refer to an embodiment providing greater possibilities in this respect, making use of a pantograph marked (16) overall, having its fixed joint point at 17 on a board 18 provided with a 'joystick' 6 support bracket 19. The latter is installed with its lever pointing downwards and connected with joint point 20 of the pantograph which follows, on a reduced scale, the path described by the free end of the pantograph which carries a pointing stylus 21. The lever-pantograph link here comprises a coupling with a tubular stem 22 sliding on the lever, with a spring 23 inserted between and a ball joint 24 fitted in a cup formed by the pantograph joint pin 20, which also acts as a support leg sliding over the board 18 and keeping it at the same height as the arm carrying the stylus 21 and the fixed point 17 of the pantograph.

It will be understood that the scaling down ratio between stylus 21 movements and lever movements may also be adapted to requirements by adopting several possible pantograph setting positions in the normal way.

Figure 4:
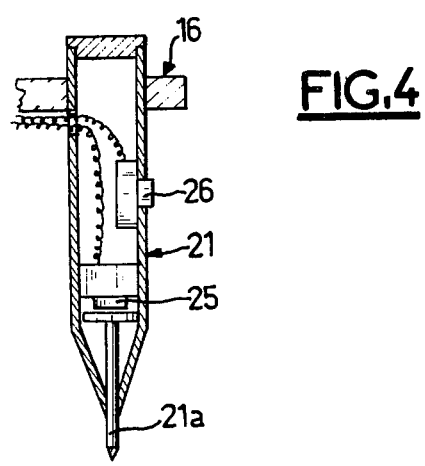
FIG. 4 is a section view of a stylus which can be used with the embodiment dealt with in FIG. 2 or with the other following embodiments.

FIG. 4 is a detail view of the pointing stylus 21 as it may be embodied in this case with, in its tubular body, a spring-loaded electric contact pushbutton 25, normally open and closing when a movable tip 21a of the stylus is pressed on the reference surface, along with a manual pushbutton 26, both being designed to be connected like switches 11, 12 in the preceding embodiment, on the basis of the same overall connection with the computer.

Figure 5:
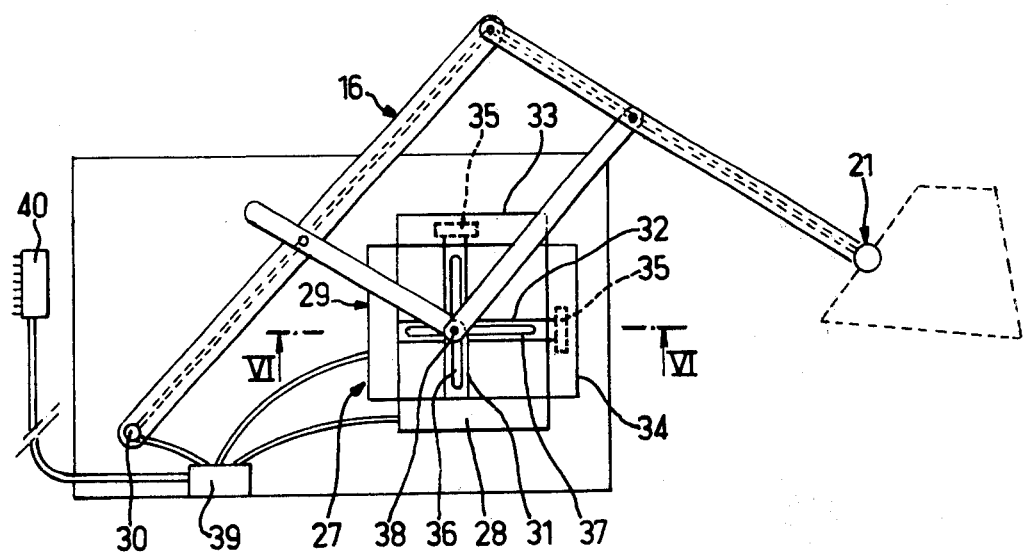
FIG. 5 is a plan view of a third embodiment of a generating device according to the invention.
Figure 6:
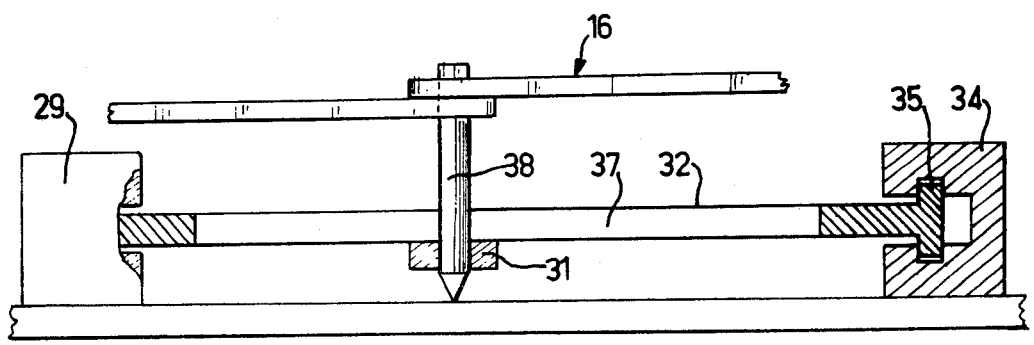
FIG. 6 is a detail view in section VI—VI of FIG. 5.

FIGS. 5 and 6 refer to another embodiment with a pantograph 16, but with a signal generator 27 having two straight-line potentiometers 28, 29 fixed at right angles to a board on which a fixed pantograph joint point is also provided at 30. The potentiometer sliders are respectively connected with two bars 31, 32 extending orthogonally to each potentiometer and between them, and each having a respective guide rail 33, 34 fixed to the board in which they are guided at their free end by means of sliding shoes 35 capable of making them move properly at right angles to the corresponding potentiometer. These bars have intersecting slideways 36, 37 which are engaged at their point of intersection by a leg 38 forming both the movable part of the generator 27 and the scaled-down movement joint pin of the pantograph, which carries a stylus 21 on its free end like the one described previously.

The electrical conductors leading from the potentiometers 28, 29 and from the stylus 21 can be joined as shown to a box 39 from which a single conductor sheath runs to a pin-type connector 40 like a joystick output connector. It is, of course, possible to connect each bar between two combined potentiometers to supply a more accurate average signal representing the corresponding coordinate.

It will be noted that application of this type of system is not limited to plots, drawings or shape exploration, but that the reference surface can be designed in the form of compartments, possibly representing a keyboard which can here be advantageously interchangeable depending on the application and which can at the same time form a quick guide to all the instructions or controls relating to each applications. Such a keyboard can easily contain over a hundred compartments which can each themselves have multiple functions selectable by means of a switch placed on the stylus, the reference surface or any other fixed part of the system. Furthermore a system of this type can be used for processing information documents ticked in a given position or with the data being marked in some other way in predetermined positions which will be checked with the pointing stylus for input to the computer.

Depending on the importance attached to the accuracy of recovery for display of a recorded drawing, it will be possible to correct any distortion inherent in the system through conversion software integrated into the computer, notably when a 'joystick' is used.

Of course still other variants can be thought up without, however, going outside the field of the invention.

We claim:

1. A device for generating electric signals representing the position coordinates of a stylus on a reference surface, characterized in that it comprises a signal generator (6, 29) that is fixed with respect to the reference surface and comprising a movable part (5, 38) which works in conjunction with at least two potentiometers generating the voltages representing the said coordinates, the stylus (7, 21) being a stylus for pointing on the reference surface, and mechanical linkage means being provided between this stylus and the said movable part so as to obtain a scaling down effect on the movements given to the stylus when they reach the potentiometers.

2. The signal generating device according to claim 1, characterized in that the signal generator is two rotary potentiometers which work in conjunction with, as the moving part, a universally swivelling lever of given angular range, the generator being supported in a cantilever position above the reference surface, with the lever pointing down, and with the pointing stylus-lever linkage means forming a telescopic coupling.

3. The signal generating device according to claim 1, characterized in that the said movable part of the generator is linked to the scaling-down joint of a pantograph having its hinge joint fixed with respect to the reference surface and having the movable end arm fitted with the pointing stylus.

4. The signal generating device according to claim 3, characterized in that the signal generator is two rotary potentiometers which work in conjunction with, as movable part, a universally swivelling lever having a given angular range, the said linkage means comprising a telescopic and ball joint coupling between the lever and the scaling-down joint of the said pantograph.

5. The signal generating device according to claim 1, characterized in that the signal generator has two straight-line potentiometers placed orthogonally and having sliders connected to two orthogonal bars having an intersection point engaged by the said movable part, with the latter being rigidly connected to the scaling-down joint of the said pantograph.

6. The signal generating device according to claim 5, characterized in that the said bars have converging slideways engaged at their intersection point by the said movable part.

7. The signal generating device according to claim 6, characterized in that the pointing stylus comprises an electrical contact which is sensitive to the action of pointing or pressing on the reference surface and can be used as component electrically activating a system recording the transmitted signals.

8. The signal generating device according to claim 7, characterized in that the pointing stylus comprises a manually controlled electric switch which can be used as component electrically activating a system recording the signals.

9. The generating device according to claim 8, characterized in that the reference surface comprises a drawing zone and/or a zone corresponding to control or data or special instruction recording positions.

10. The generating device according to claim 8, characterized in that a representation of a keyboard that is interchangeable according to application is used as reference surface.

11. The generating device according to claim 10, characterized in that it comprises a keyboard compartment multiple function selection switch.

* * * * *